A. L. CUSHMAN.
DYNAMO ELECTRIC MACHINE.
APPLICATION FILED FEB. 15, 1908.

932,537.

Patented Aug. 31, 1909.

Witnesses:
Charles D. Woodberry
Josephine H. Ryan

Inventor.
Abe Lincoln Cushman,
by Roberts, Roberts & Cushman
Attorneys

UNITED STATES PATENT OFFICE.

ABE LINCOLN CUSHMAN, OF CONCORD, NEW HAMPSHIRE, ASSIGNOR OF ONE-HALF TO BENJAMIN A. KIMBALL, OF CONCORD, NEW HAMPSHIRE.

DYNAMO-ELECTRIC MACHINE.

932,537.  Specification of Letters Patent.  Patented Aug. 31, 1909.

Application filed February 15, 1908. Serial No. 415,998.

*To all whom it may concern:*

Be it known that I, ABE LINCOLN CUSHMAN, a citizen of the United States, and resident of Concord, in the county of Merrimack and State of New Hampshire, have invented new and useful Improvements in Dynamo-Electric Machines, of which the following is a specification.

My invention relates to dynamo-electric machines, and is particularly adapted to variable speed, shunt wound, direct current motors, in which the speed of the armature may be varied by varying the ampere turns in the field magnets of the motor. Its object is to provide improved means for overcoming armature reaction and to secure sparkless commutation at the brushes without the necessity of shifting the brushes. This is accomplished by the use of commutating magnets in conjunction with the main field magnets of the motor, the details of which will be hereinafter pointed out.

Figure 1:
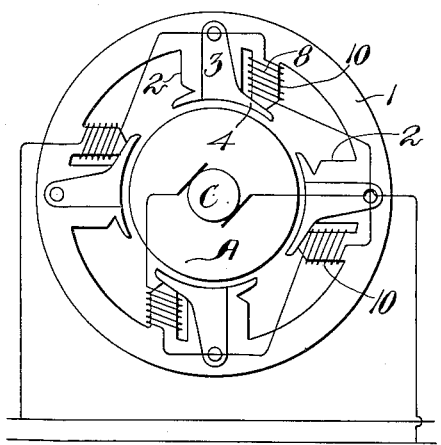
Figure 2:
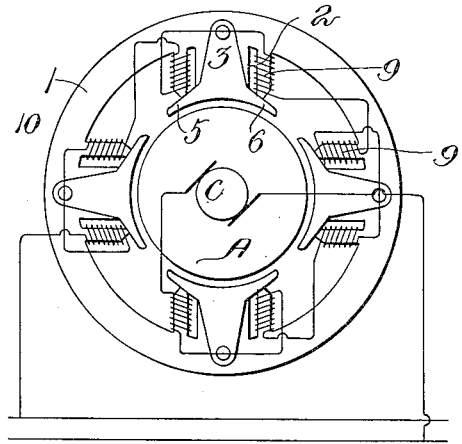
Figure 3:
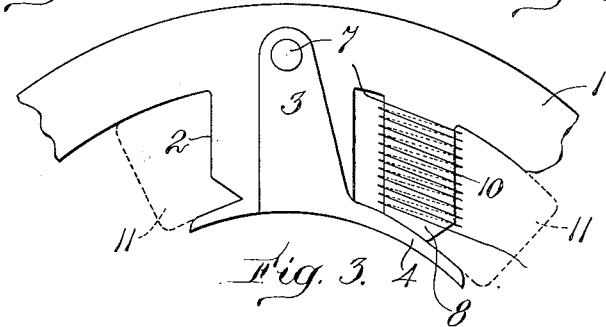

In the accompanying drawings which illustrate certain embodiments of my invention:—Figure 1 shows a motor in diagrammatic form containing one form of my invention; Fig. 2 shows a motor in diagrammatic form containing another form of my invention; Fig. 3 is an enlarged detail illustrating the main field magnet core and commutating magnet core with their respective windings, of the form shown in Fig. 1; and Fig. 4 is an enlarged detail illustrating the main field magnet core and commutating magnet cores with their respective windings of the form shown in Fig. 2.

The frame of the field magnet comprises the yoke 1 provided with the main field magnet cores 2 projecting radially inward from the yoke. Each main core is preferably provided with flaring or extended pole shoes, and the extended pole shoes are preferably made removable to admit of placing the coils upon the cores, or removing them therefrom, ready wound. In Figs. 1 and 3 is illustrated one form of removable pole shoe, which may be termed an L-shaped shoe, comprising the tongue 3, fitted into a corresponding recess in the core, and the extended tip or shoe 4. In Figs. 2 and 4 is illustrated another form of removable pole shoe, which may be termed a T-shaped shoe, comprising the tongue 3, fitting into a corresponding recess in the core, and the pair of oppositely extended tips or shoes 5 and 6. In either form a bolt 7, located back of the area of the field windings and in the magnetic yoke, holds the removable section in place. The frame is also provided with commutating magnet cores projecting inward from the yoke 1 beside the main cores 2. In the form shown in Figs. 1 and 3 one such commutating magnet core 8 is provided beside each main magnet core, and is separated therefrom by a space and extends from the yoke 1 to the outer side of the removable extended pole shoe 4.

Figure 4:
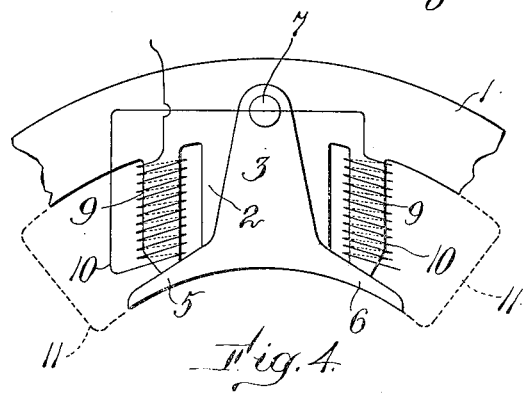

In the form shown in Figs. 2 and 4, a pair of commutating magnet cores 9 are provided, one on each side of each main core, and are separated therefrom by a space and extend from the yoke 1 to the outer side of the extensions 5 and 6 respectively of the removable pole shoe. Thus in either case, both the main field magnetizing coils and the commutating coils may be made up and placed in or removed from position ready-wound, the extended pole shoes being removed for that purpose. The armature is shown at A, and the commutator at C.

The circuits are as follows: The commutating coils or windings 10 are in series with each other and with the armature circuit as shown. The field coils or windings 11 are in series with each other and in shunt with the armature and the commutating magnet circuit. The field circuit is not shown as it is the same as is usual in such motors and will be readily understood by those skilled in the art.

The field windings 11 inclose the main field core and also the commutating cores and windings as shown in Figs. 3 and 4.

I claim:

1. In a dynamo-electric machine, a frame for field and commutating magnets comprising a main core projecting from the yoke of the frame having an extended pole shoe, and a commutating magnet core beside the main core and projecting from said yoke to the outer side of said extended pole shoe, a commutating winding on said commutating core in series with the armature circuit, and a main field magnet winding in shunt with the armature circuit and inclosing both the main magnet core and the commutating magnet core and winding.

2. In a dynamo-electric machine, a frame for field and commutating magnets comprising a main core projecting from the yoke of the frame, having a removable pole shoe extended in both directions, a pair of commutating magnet cores, one at each side of the main core, projecting from the yoke to the outer sides of the extensions of said pole shoe, a commutating coil on each of said commutating cores in series with each other and with the armature circuit, and a main field coil in shunt with the armature circuit and inclosing both the main magnet core and commutating magnet cores and coils, said extensions of the removable pole shoe adapted to hold in place the main field coil and the commutating magnet coils.

Signed by me at Concord, New Hampshire, this eighth day of February, 1908.

ABE LINCOLN CUSHMAN.

Witnesses:
JOHN F. WEBSTER,
RAY E. BURKETT.